United States Patent

Kubo et al.

[11] Patent Number: 6,118,573
[45] Date of Patent: Sep. 12, 2000

[54] ELECTRODE FOR ELECTROCHROMIC DEVICE AND ELECTROCHROMIC DEVICE

[75] Inventors: Takaya Kubo; Tomohiro Toya, both of Yokohama; Yukio Kobayashi, Tokyo, all of Japan

[73] Assignee: Nippon Oil Co., Ltd., Tokyo, Japan

[21] Appl. No.: 08/998,214

[22] Filed: Dec. 24, 1997

[30] Foreign Application Priority Data

Dec. 24, 1996 [JP] Japan ..................................... 8-343759
Jan. 23, 1997 [JP] Japan ..................................... 9-010467

[51] Int. Cl.[7] ...................................................... G02F 1/155

[52] U.S. Cl. .......................... 359/266; 359/267; 359/273; 359/452; 252/511; 252/519.33; 428/195

[58] Field of Search ..................................... 359/265, 266, 359/267, 269, 271, 273, 452; 252/511, 519.33, 299.01, 299.5; 428/1.1, 195

[56] References Cited

U.S. PATENT DOCUMENTS

| | | | |
|---|---|---|---|
| 4,167,308 | 9/1979 | Barclay et al. | 359/266 |
| 4,693,564 | 9/1987 | Mori | 359/266 |
| 4,750,816 | 6/1988 | Ito et al. | 359/266 |
| 5,413,739 | 5/1995 | Coleman | 252/511 |
| 5,416,617 | 5/1995 | Loiseaux et al. | 359/267 |

*Primary Examiner*—Loha Ben
*Attorney, Agent, or Firm*—Darby & Darby

[57] ABSTRACT

An electrode for an electrochromic device is disclosed having an electrically conductive substrate and a plurality of capacitive members arranged on the substrate, each of the capacitive members containing fine particles bound together with a binder, the fine particles having electric capacity of not less than 1 farad/g, the binder in the capacitive member having degree of swelling of not higher than 20 mass % when measured after the binder in the capacitive member is immersed in γ-butyrolactone at 25° C. for 24 hours. Also disclosed is an electrochromic device having the above electrode as a counterelectrode, an electrochromic electrode, and an electrolyte interposed therebetween.

24 Claims, 3 Drawing Sheets

ELECTRODE FOR ELECTROCHROMIC DEVICE AND ELECTROCHROMIC DEVICE

FIELD OF THE INVENTION

The present invention relates to an electrode for an electrochromic device which may be used as a light-modulating device or a display device, and an electrochromic device provided with such electrode.

BACKGROUND OF THE INVENTION

An electrochromic device which is applicable to a variety of light-modulating devices or display devices is composed of, for example, a transparent substrate, a transparent electrically conductive film, an electrochromic film colored by oxidation or reduction, an electrolyte, an electrochromic film colored by reduction or oxidation, and a transparent electrically conductive film, provided one on another in this order.

For such an electrochromic device, there is proposed to use a $WO_3$ film as the electrochromic film colored by reduction for its practical durability and coloring efficiency. On the other hand, there has been found no material for the electrochromic film colored by oxidation, or an ion storage film which is comparable to $WO_3$ in practical durability and coloring efficiency, and merely NiO or the like materials has been proposed.

Even when $WO_3$ is used as the material colored by reduction in producing an electrochromic device, the performance of the electrochromic device greatly depends not only on the $WO_3$ element, but also on the material of the counter electrode.

There have been proposed, for example, light-modulating devices for use in a sunshine roof of a vehicle having an electrode provided with an electrochromic film colored by oxidation, such as of IrO or Prussian blue opposite to the $WO_3$ electrode. However, none of them has sufficient heat resistance, moisture resistance, UV resistance, and shake resistance for commercialization. In order to achieve the stabilized operation of a light-modulating glass under more than a hundred thousand times of electrochromic operation, the opposing electrode is required to have sufficient electrochemical stability.

For the purpose of improving the coloring efficiency, which is one of the most important factors of the electrochromic properties, Japanese Laid-open Patent Application Nos. 6-281970 and 7-134318 propose an electrode configured in the form of stripes or dots which can be used as an electrode opposite to the electrode provided with a film of a material colored by either oxidation or reduction.

In order to further improve the durability of an electrochromic device, it is essential to maintain not only the excellent electrochemical properties but also the mechanical strength of the counter electrode for a prolonged time. Such further improvement is also demanded for the counterelectrode mentioned above.

DISCLOSURE OF THE INVENTION

It is an object of the present invention to provide an electrode for an electrochromic device which has excellent mechanical and electrochemical durability.

It is another object of the present invention to provide an electrochromic device which has excellent coloring-bleaching response independent from the kind of the electrochromic material, and which has prolonged coloring-bleaching cycle life.

According to the present invention, there is provided an electrode for an electrochromic device comprising an electrically conductive substrate and a plurality of capacitive members arranged on said substrate, each of said capacitive members comprising fine particles bound together with a binder, said fine particles having electric capacity of not less than 1 farad/g, said binder in the capacitive member having degree of swelling of not higher than 20 mass % when measured after the binder in the capacitive member is immersed in γ-butyrolactone at 25° C. for 24 hours.

According to the present invention, there is further provided an electrochromic device comprising the electrode for an electrochromic device as mentioned above as a counterelectrode, an electrochromic electrode, and an electrolyte interposed be-ween the counterelectrode and the electrochromic electrode.

PREFERRED EMBODIMENT OF THE INVENTION

Figure 1:
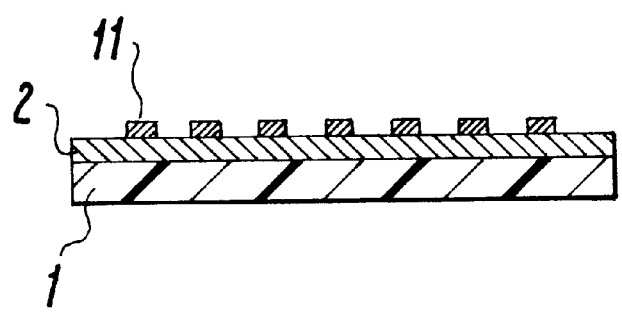
FIG. 1 is a cross-sectional view of one embodiment of the electrode for an electrochromic device of the present invention.

The present invention will now be explained in more detail.

The electrode for an electrochromic device of the present invention has an electrically conductive substrate and a plurality of particular capacitive members arranged on the substrate, and each capacitive member contains particular fine particles bound together with a particular binder for molding.

The electrically conductive substrate used in the present invention may be selected from a variety of metal plates and transparent or opaque substrates other than metal plates provided with an electrically conductive film. Among them, a transparent electrically conductive substrate such as a substrate essentially composed of a transparent substrate and a transparent electrically conductive film formed thereon, is preferred.

The transparent substrate is not particularly limited, and the material, thickness, dimensions, and configuration may suitably be selected depending on the purpose. For example, colorless or colored glass, wired glass, or glass blocks may be used. Alternatively, colorless or colored transparent resins may also be used. Examples of such resins may include polyesters such as polyethylene terephtharate; polyamide, polysulfone, polyether sulfone, polyether ether ketone, polyphenylene sulfide, polycarbonate, polyimide, polymethyl methacrylate, polystyrene, cellulose triacetate, and polymethyl pentene. The term transparent used herein means to have a light transmittance of 10 to 100%. The term substrate used herein means a material having a smooth surface at an ordinary temperature, and the surface may be flat or curved, or deformable by stress.

The transparent electrically conductive film is not particularly limited as long as it can achieve the object of the present invention. For example, a thin metal film of gold, silver, chromium, copper, or tungsten, or an electrically conductive film of a metal oxide may be used. The metal oxide may be ITO ($In_2O_3$—$SnO_2$), $SnO_2$:F, tin oxide, zinc oxide, ZnO:Al, or vanadium oxide.

The thickness of the transparent electrically conductive film is usually 100 to 5000 Å, preferably 500 to 3000 Å. The surface resistivity (resistivity) of the film may suitably be selected depending on the purpose, but usually be 0.5 to 500 $\Omega$/sq., preferably 2 to 50 $\Omega$/sq.

A method for forming the transparent electrically conductive film on the transparent substrate is not particularly limited, and may be selected from the conventional methods depending on the kind of the metal or metal oxide to be used for forming the transparent electrically conductive film. Usually, vacuum deposition method, ion plating method, or sputtering method is employed. In any case, it is preferred to set the substrate temperature within the range from 20 to 350° C. for forming the film.

The particular fine particles mentioned above have the electric capacity of not less than 1 farad/g, preferably not less than 5 farad/g, more preferably not less than 10 farad/g.

It is preferred that the fine particles may further have, for example, at least one of the particular electrical conductivity and the particular capability of storing electric charge. The electrical conductivity may usually be not lower than $10^{-8}$ S·cm$^{-1}$, preferably not lower than $10^{-5}$ S·cm$^{-1}$, more preferably not lower than $10^{31}$ S·cm$^{-1}$, and the capability for storing electric charge may usually be not less than 1 coulomb/g, preferably not less than 5 coulomb/g, more preferably not less than 10 coulomb/g.

Examples of the material of such fine particles may include porous carbon, an intercalation material, an electrically conductive polymer, or mixtures thereof.

The material of the fine particles having the electric capacity of not less than 1 farad/g may be porous carbon having the specific surface area of not less than 10 m²/g, preferably 50 to 5000 m²/g, more preferably 300 to 4000 m²/g. Activated carbon is particularly preferred, but the material is not limited thereto. When the porous carbon having the specific surface area of less than 10 m²/g is used for producing the electrode for an electrochromic device, the degree of coloration may not be sufficient when the voltage of 1 V or lower is applied to the device. Further, the activated carbon mentioned above is preferably in the form of powders. Such activated carbon may be produced by carbonizing and activating coconut husk, petroleum pitch, phenol resin, rayon, phenol fibers, or polyacrylonitrile fibers.

Examples of the material of the fine particles having the capability of storing not less than 1 C/g of electric charge in addition to the particular electric capacity may include the intercalation material or the electrically conductive polymer as mentioned above. Among these, materials capable of storing the above-mentioned amount of electrical charge at the applied voltage of 3 V or lower are particularly preferred. Examples of the intercalation material may include conventionally known disulfides such as $TiS_2$ and $MoS_2$; dioxides such as $CoO_2$ and $NiO_2$; and electrochromic oxides such as $W_{18}O_{48}$ and $W_{20}O_{58}$. The electrically conductive polymer may be obtained by subjecting a polymer mainly composed of polyaniline, polythiophene, polypyrrole, polyphenylene vinylene, polyacene, or mixtures thereof to doping.

The particle size of the particular fine particles mentioned above is not particularly limited as long as the object of the present invention is achieved, but is usually 0.1 to 500 $\mu$m, preferably 0.3 to 200 $\mu$m, more preferably 0.5 to 50 $\mu$m in the average particle size. The particle size distribution is not particularly limited as long as the fine particles are within the above average particle size, and may arbitrarily be decided so as to achieve the object of the present invention. However, the preferred upper limit of the particle size is usually about 700 $\mu$m.

The particular binder mentioned above has the degree of swelling, when measured after it is immersed in $\gamma$-butyrolactone at 25° C. for 24 hours, of not higher than 20 mass %, preferably not higher than 10 mass %, more preferably 5 mass %, most preferably 2 mass %. The degree of swelling is calculated with the following formula:

$$\text{Degree of swelling } (\%) = ((V_{24} - V_0)/V_0) \times 10$$

wherein $V_0$ stands for the initial weight of the binder before it is immersed in $\gamma$-butyrolactone, and $V_{24}$ stands for the weight of the binder after it is immersed in $\gamma$-butyrolactone at 25° C. for 24 hours. If the degree of swelling is higher than 20 mass %, the distance between the particular fine particles increases with the lapse of time to thereby decrease electrical conduction paths. Accordingly, the light-modulating electrochromic material cannot store sufficient quantity of electricity for coloration, which may cause decrease in response time of the electrochromic device and/or degree of coloration. Particularly preferred binders have the degree of swelling as mentioned above, and in addition, they are substantially not electrolyzed, and substantially unreactive to the electrolytic solution or the electrolyte when the binders are used in the counterelectrode of an electrochromic device.

In the present invention, the degree of swelling of the binder in the capacitive member, is measured by simulating, with only the binder, the state of the binder in the capacitive member for use. That is, when the capacitive member is prepared by mixing the fine particles, the binder, and optionally other components, and subjecting the mixture to use as the capacitive member for the electrode without any reaction, the degree of swelling as mentioned above is that of the binder itself as measured in $\gamma$-butyrolactone. On the other hand, when the capacitive member is prepared by mixing the fine particles, a precursor of the binder, and optionally other components, curing the mixture by reaction under a particular condition, and subjecting the cured product to use as the capacitive member for the electrode, the degree of swelling as mentioned above is measured by curing the precursor of the binder alone by the reaction under the same condition as in preparation of the capacitive member, and measuring the degree of swelling of the cured product, i.e. the binder, in $\gamma$-butyrolactone.

Examples of the binder may include silicon resins, epoxysilane resins, phenol resins, and epoxy resins. Among these, silicon resins are particularly preferred. The number average molecular weight of the precursor of these resins is particularly 200 to 20000, preferably 500 to 15000, more preferably 1000 to 10000, most preferably 2000 to 6000.

The kind of the silicon resins is not particularly limited, but particularly preferred are reactive silicon resins, i.e. reactive silicon resins prepared by curing a precursor (binder precursor) such as a silicon resin having an alkoxysilyl group and/or a silanol group.

The reactive silicon resin is usually synthesized by partial hydrolysis of alkoxysilanes or chlorosilanes followed by condensation. Among the commercially available products, for example, pure silicon varnish such as "XO07931-CLEAR" (trade name) manufactured by OKITSUMO CORPORATION; silicon resins such as "SR2410" (trade name) manufactured by TORAY DAUCORNING SILICONE CORPORATION, or "RZ7703" (trade name) manufactured by NIPPON UNIKER CORPORATION; or silicon resins denatured with acryl such as "SILACOAT1000" (trade name) manufactured by CHISSO CORPORATION are particularly preferred. When the silicon resin is used as the binder, the resin may be dissolved in a solvent of a variety of kinds to prepare a solution, which is then used to bind the particles, as long as the object of the present invention is achieved. The solvent is not particularly limited, and may be a variety of hydrocarbon solvents, ketones, ethers, esters, or ether-esters. Alternatively, the silicon resins may be aged before use. The conditions for curing the binder precursor to give the binder may suitably be selected depending on the kind of the binder precursor to be used or the binder to be produced, or the kind of the fine particles. For example, when the binder precursor is cured by heating, the heating temperature is usually 20 to 35° C., preferably 70 to 300° C. more preferably 100 to 250° C., most preferably 120 to 180° C. The duration of heating is usually 10 to 300 minutes, preferably 30 to 200 minutes, more preferably 40 to 150 minutes, most preferably 45 to 120 minutes. In general, the lower the temperature of heating for curing, the longer the duration of the heating.

In mixing the fine particles and the binder, the less the content of the binder, the larger the electrochemical capacity of the capacitive member in general. In this case, however, the mechanical strength of the capacitive member is decreased. Accordingly, the mixing ratio of the fine particles to the binder is particularly 90:10 to 20:80, preferably 75:25 to 30:70, more preferably 60:40 to 40: 60, most preferably 55:45 to 45:55 by weight.

In the present invention, the capacitive member is basically composed of the fine particles and the binder, wherein the fine particles are bound together with the binder. In addition, in order to improve the electrical conductivity between the fine particles, the fine particles may preferably be mixed with another electrically conductive material other than the fine particles such as graphite, acetylene black, ketchen black, fine metal particles, or electrically conductive conjugated organic materials, for example, polyphenylenevinylene, polythiophene, or polypyrrole each subjected to doping. The amount of the electrically conductive material to be mixed with the fine particles is equal to or less than the amount of the fine particles, preferably not more than 30 weight %, more preferably not more than 10 weight %, most preferably not more than 2 weight % of the total weight of the fine particles and the electrically conductive material together.

The capacitive members are arranged on an electrically conductive substrate, preferably on a transparent electrically conductive film formed on a substrate. The arrangement is not particularly limited, and may suitably be selected depending on, for example, the material of the member, capacity of the electrochromic material, object of use, or grade of the device, as long as the transparency or light transmitting property required for the electrode as a whole is achieved. Usually, it is preferred to shape each capacitive member in the form of a dot and arrange in contact with or spaced apart from each other, or to shape in the form of a stripe. Specifically, the capacitive members may be arranged in the form of longitudinal, transverse, or corrugated stripes, a lattice pattern, or a net formed of a combination of stripes in more than three directions. When the definition of image or landscape transmitted through the device or the sharpness of reflected image is required, the capacitive members are preferably configured in the form of dots or stripes, and arranged in a plurality of lines at substantially regular intervals, or in a net or lattice pattern with two directions perpendicular to each other. When the capacitive members are configured in the form of stripes or a net, the width of each stripe or the line of the net is usually 50 to 5000 $\mu$m, preferably 100 to 2000 $\mu$m. The intervals between the stripes or the lines may be decided arbitrarily depending on the capacity of the counter electrode or appearance, but usually 0.3 mm to 10 cm, preferably 0.5 mm to 8 cm, more preferably 1.0 mm to 5 cm. The thickness of each stripe or line is not particularly limited, but usually not less than 50 $\mu$m, preferably not less than 100 $\mu$m, more preferably not less than 130 $\mu$m. When the capacitive members are configured in the form of dots, the size of each dot is such that the projection of each dot onto the electrically conductive substrate is contained in a circle with the diameter of usually 50 to 10000 $\mu$m, preferably 100 to 5000 $\mu$m, more preferably 150 to 2000 $\mu$m. The thickness of each dot is not particularly limited, but usually not less than 50 $\mu$m, preferably not less than 100 $\mu$m, more preferably not less than 130 $\mu$m. The intervals between the dots may be decided arbitrarily depending on the capacity of the counter electrode or appearance, but usually 0.2 mm to 10 cm, preferably 0.5 mm to 8 cm, more preferably 1.0 mm to 5 cm.

The coverage of the electrode with the capacitive members ((the total area of the capacitive members/area of the electrode)×100) may suitably be selected, but usually 3 to 70%, preferably 5 to 50%. The size or width of the capacitive members are not necessarily uniform.

The mechanical strength of the capacitive members formed on the transparent electrically conductive substrate is not particularly limited, but preferably relatively high. For example, when the capacitive members are in the form of dots or stripes, the strength is usually not lower than 10 gf, preferably not lower than 50 gf, more preferably not lower than 100 gf, most preferably not lower than 200 gf. The maximum mechanical strength is not particularly limited, but usually about 10000 gf.

In order to improve the visibility and appearance of the device in the bleached state, a coating material such as a white pigment or a white or silver electrically conductive paste may be applied to the surface of the electrically conductive substrate of the electrode in registration with the capacitive members. Specifically, such a coating material may be applied, for example, by a method including the steps of applying a white pigment on a transparent substrate in the pattern identical with or similar to that of the capacitive members to be formed, laminating a transparent electrically conductive film thereon to cover the entire surface, and then arranging the capacitive members on the conductive film in the pattern; a method including the steps of applying a white or silver electrically conductive paste on an electrically conductive substrate in the pattern similar to that of the capacitive members to be formed, and then arranging the capacitive members in the pattern on the conductive paste; or a method including the steps of applying a white pigment on one surface of a transparent substrate in the pattern similar to that of the capacitive members to be formed, laminating a transparent electrically conductive film over the opposite surface of the substrate, and then arranging the capacitive members in the pattern on the conductive film.

Examples of the white pigment mentioned above may include titanium oxide, zinc oxide, lithopone, white lead, antimony white, and zirconium oxide.

Next, a method for producing the electrode of the present invention is explained.

The method for producing the electrode of the present invention is not particularly limited, and a variety of methods such as follows may be employed:

(1) a method including the steps of mixing the fine particles, the binder, and optionally the electrically conductive material with an organic solvent such as butyl cellosolve to prepare a paste, applying the paste on an electrically conductive substrate surface in a desired pattern by conventional printing method such as screen printing, lithographic printing, gravure printing, intaglio printing, flexographic printing, relief printing, or special printing, and curing the paste, if necessary;

(2) a method including the steps of forming grooves of a desired pattern on the surface of an electrically conductive substrate, charging the paste of the capacitive member material in the grooves, scraping the excess paste off with a spatula, and curing the paste in the grooves, if necessary;

(3) a method including the steps of mixing the fine particles, the precursor of the binder, and optionally the electrically conductive material to prepare a paste, applying the paste on an electrically conductive substrate surface in a desired pattern by conventional printing method as listed above, and curing the paste to give the cured binder;

(4) a method including the step of dragging a nozzle of a dispenser on an electrically conductive substrate while discharging the paste of the capacitive member material from the nozzle to draw a desired pattern such as stripes on the substrate;

(5) a method including the steps of applying the paste of the capacitive member material in a desired pattern on a flexible film by screen printing, transferring the patterned paste onto an electrically conductive film, and curing the paste on the conductive film;

(6) a method including the steps of applying the paste of the capacitive member material in a desired pattern on a flexible film by screen printing, laminating the flexible film with the patterned paste on an electrically conductive substrate, and curing the paste, wherein the flexible film may be of a type which disappears during the curing process, or which dissolves in an electrolytic solution after the electrode is assembled to an electrochromic device; or (7) a method including the steps of molding the paste of the capacitive member material in advance in a desired shape, curing the shaped paste, and adhering the cured, shaped paste on an electrically conductive substrate in a desired pattern.

Among these, the printing method and a method using a dispenser are equally preferred.

In forming the pattern by the method using a dispenser, the distance between the tip of the dispenser nozzle and the substrate surface may suitably be selected depending on the thickness and widths of the stripes to be formed, but usually about 0.01 to 10 mm. The discharge rate of the paste from the dispenser nozzle is usually about 1 to 50 mg/s. The rate for dragging the dispenser on the substrate is usually 1 to 700 mm/s, preferably 10 to 500 mm/s. A plurality of the dispenser nozzles may be used depending on the pattern to be formed or for shortening the time required for forming the pattern.

The electrode of the present invention may be used in a variety of electrochromic devices. An electrochromic device equipped with the electrode of the present invention as a counterelectrode is now explained hereinbelow.

The electrochromic device employing the electrode of the present invention as a counterelectrode is typically composed of the counterelectrode, an electrochromic electrode wherein, for example, an electrochromic film colored by oxidation or reduction is formed on a transparent electrode substrate, and an electrolyte interposed between the counterelectrode and the electrochromic electrode.

For the electrochromic electrode, preferred examples of the material of the electrochromic film may include materials colored by reduction such as $WO_3$, $MoO_3$, $V_2O_5$, $Nb_2O_5$, or $TiO_2$; materials colored by oxidation such as NiO, $Cr_2O_3$, $MnO_2$, CoO, $IrO_2$, or Prussian Blue; or organic electrochromic materials such as polyaniline. These materials may be coated in the form of a film on the substrate by conventional method such as vacuum deposition method, electron beam evaporation, or sputtering method.

The transparent electrode substrate on Which the electrochromic film is to be formed may be those listed for the transparent electrically conductive substrate mentioned above.

The electrolyte may suitably be selected from liquid electrolytes and solid electrolytes depending on the purpose. The liquid electrolyte may be a solution prepared by dissolving salts of alkali metals or salts of quaternary ammonium in an organic solvent such as propylene carbonate, ethylene carbonate, sulfolane, γ-butyrolactone, dimethylformamide, dimethyl sulfoxide, tetrahydrofuran, dimethoxyethane, or mixtures thereof. The solid electrolyte may be a polymer solid electrolyte prepared by, for example, dissolving salts of alkali metals or salts of quaternary ammonium in a polymer matrix such as polyethylene oxide or polyoxyethylene glycol polymethacrylate or in the liquid electrolyte mentioned above substantially fixed to these polymer matrices.

Figure 2:
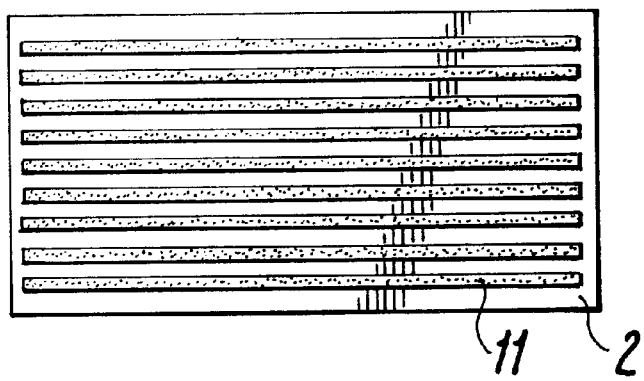
FIG. 2 is a schematic plan view of one embodiment of the electrode for an electrochromic device of the present invention.
Figure 3:
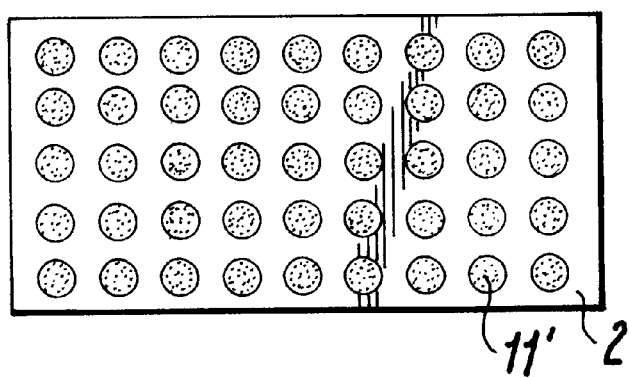
FIG. 3 is a schematic plan view of another embodiment of the electrode for an electrochromic device of the present invention.
Figure 4:
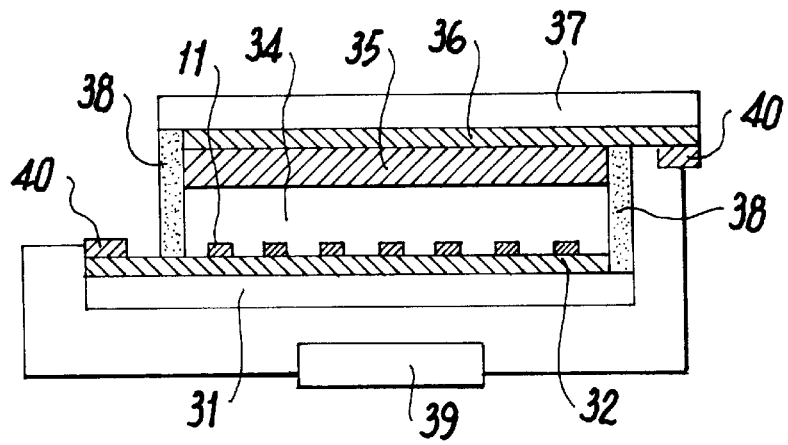
FIG. 4 is a cross-sectional view of one embodiment of the electrochromic device of the present invention.

A preferred embodiment of the electrochrormic device of the present invention is shown in FIG. 4. This device has a counterelectrode which is composed of a transparent substrate 31, a transparent electrically conductive film 32 formed on the substrate, and stripe members 11 or dot members 11' containing the particular fine particles bound together with the binder and arranged on the conductive film at suitable regular intervals. The cross-sectional view taken parallel to the side face of the counterelectrode is shown in FIG. 1, and the plan views of the counterelectrode are shown in FIGS. 2 and 3. In the FIG. 1 denotes a transparent substrate, and 2 denotes a transparent electrically conductive film. Opposite to the counterelectrode, an electrochromic electrode is provided which is composed of a transparent substrate 37, a transparent electrically conductive film 36 formed on the substrate, and an electrochromic film 35 colored by reduction or oxidation formed on the conductive film. The space between the counterelectrode and the electrochromic electrode is filled with an electrolyte 34, and the periphery of the electrodes is sealed with a sealing material 38. Each of the transparent electrically conductive films 32 and 36 is connected via a bus bar 40 to a power supply 39 by a lead wire.

Figure 5:
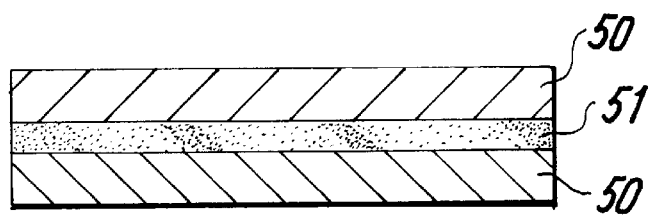
FIG. 5 is a cross-sectional view of one embodiment of a bus bar for an electrochromic device.
Figure 6:
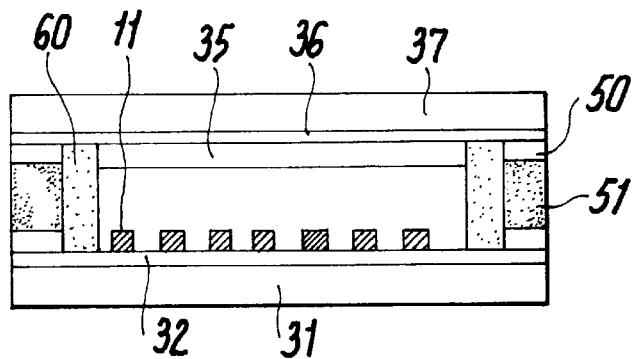
FIG. 6 is a cross-sectional view of one embodiment of an electrochromic device provided with the bus bar of FIG. 5.

In producing the electrochromic device of the present invention, there is no particular limitation to the method of placing the electrochromic electrode having an electrochromic film and the counterelectrode opposing each other and to the method of arranging the bus bar, and these may be selected from a variety of methods depending on the usage of the electrochromic device. Followings are the examples of such methods:

(1) A sheet or a ribbon of a thin film is prepared as the bus bar, composed of two electrically conductive films 50 and an insulating film 51 interposed therebetween as shown in FIG. 5. The material of the electrically conductive film 50 is not particularly limited as long as sufficient electrical conductivity is achieved, and metals such as aluminum, gold, or copper are preferably used. The bus bar is cut out in a shape in registration with the electrochromic device for arrangement in a suitable width around the periphery of the device. After that, when the electrochromic electrode (composed of a transparent substrate 37, a transparent electrically conductive film 36 formed on the substrate, and an electrochromic film 35 formed on the conductive film) and the counterelectrode (composed of a transparent substrate 31, a transparent electrically conductive film 32 formed on the substrate, and stripe members 11 formed on the conductive film) are arranged facing each other and sealed with a sealing material 60, the bus bar is positioned around the electrochromic device as shown in FIG. 6. In order to ensure sufficient electrical conductivity between the bus bar and the electrodes, an electrically conductive paste may be applied in advance to the electrically conductive film 50 of the bus bar.

Figure 7:
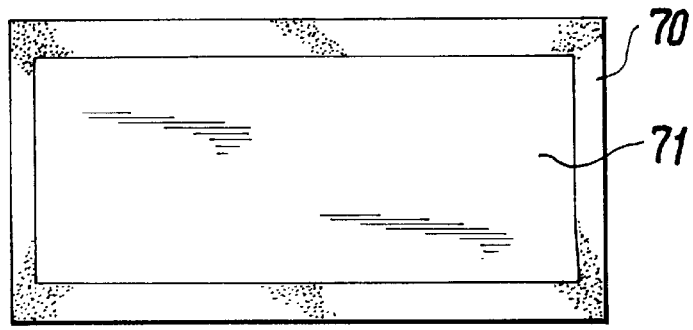
FIG. 7 is a plan view of one embodiment of an electrode for an electrochromic device provided with a bus bar therearound.
Figure 8:
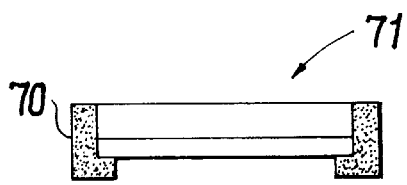
FIG. 8 is a cross-sectional view of one embodiment of an electrode for an electrochromic device provided with a bus bar therearound.
Figure 9:
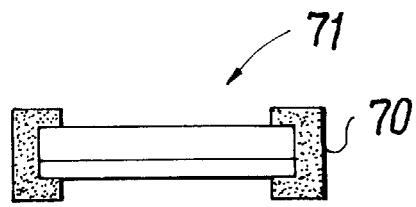
FIG. 9 is a cross-sectional view of one embodiment of an electrode provided with a bus bar therearound.
Figure 10:
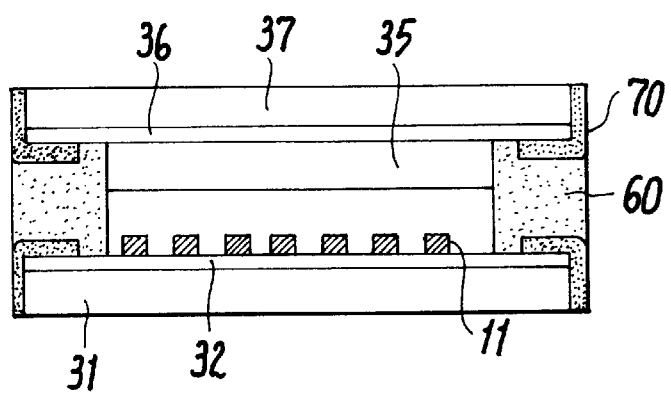
FIG. 10 is a cross-sectional view of one embodiment of an electrochromic device provided with a bus bar around the electrodes.

(2) The bus bar may also be positioned as shown in FIGS. 7, 8, and 9. FIG. 7 is a plan view showing an embodiment wherein the bus bar 70 is formed in advance around the periphery of the electrochromic electrode or the counterelectrode 71. The cross section of this embodiment may be, for example, as shown in FIG. 8 or 9 (the electrochromic film and stripe members are not shown in these figures). An electrochromic device may be produced with an electrochromic electrode (composed of a transparent substrate 37, a transparent electrically conductive film 36 formed on the substrate, and an electrochromic film 35 formed on the conductive film) provided with the bus bar 70, for example, as shown in FIG. 8 and a counterelectrode (composed of a transparent substrate 31, a transparent electrically conductive film 32 formed on the substrate, and stripe members 11 formed on the conductive film) provided with the bus bar 70 as shown in FIG. 8. The cross section of this embodiment is shown in FIG. 10. The bus bar 70 may be formed by applying to the electrode a photocuring or thermosetting electrically conductive paste in a suitable width followed by hardening, or by adhering an electrically conductive ribbon to the electrode.

The electrode for an electrochromic device of the present invention is electrochemically stable for an extremely prolonged period of time. The electrochromic device composed of such electrode as a counterelectrode and an electrochromic electrode containing a variety of electrochromic materials may be operated at low voltage, maintain excellent coloring rate for a long time in a stable manner, and improve the coloring-bleaching response and coloring efficiency.

Accordingly, the electrochromic device of the present invention may be used as a light-modulating device for windows or partitions for buildings, or glasses for vehicles. Further the electrochromic device may also be used for a variety of usage such as a character display device.

EXAMPLES

The present invention is now explained in detail with reference to Examples and Comparative Examples, but the present invention is not limited thereto.

Example 1

Preparation of Electrode 8 g of powders of activated carbon (trade name "YP17" manufactured by KURARE CORPORATION, having the specific surface area of 1500 $m^2/g$, the electric capacity of about 50 farad/g, and the average particle size of 30 $\mu$m), 4 g of graphite (trade name "USSP" manufactured by NIPPON GRAPHITE CORPORATION), 34.3 g of a silicon resin (trade name "RZ7703" manufactured by NIPPON UNIKER CORPORATION"), and 25 g of butyl cellosolve were mixed to prepare an activated carbon paste. The activated carbon paste was applied to an ITO glass substrate (a transparent electrically conductive glass substrate prepared by forming a film on a glass substrate using an $In_2O_3$:Sn target) of 10 $\Omega$/sq. in the sheet resistivity and 30 cm×30 cm in size to form stripe members each having the width of 500 $\mu$m and the thickness of 100 $\mu$m and arranged at regular intervals, so that 20% of the surface area of the substrate was covered with the stripe members. Specifically, the stripe members were formed by applying the activated carbon paste on the ITO glass substrate by screen printing method. After that, the activated carbon paste was heated at 180° C. for 90 minutes for curing, thereby preparing an electrode.

Swelling Test on Binder for Moldina Stripe Member in γ-butyrolacton

The silicon resin used above as a precursor of a binder was dissolved in butyl cellosolve, applied on a Teflon (trademark) sheet, and heated at 180° C. for 90 minutes for curing. After that, the binder thus obtained was peeled off from the Teflon sheet, and then subjected to use as a test piece for a Swelling Test. The test piece was measured of its initial weight $V_0$, and then immersed in a γ-butyrolacton (GBL) solution at 25° C. After the lapse of 24 hours, the test piece was taken out of the GBL solution, the excess GBl solution on the surface of the test piece was wiped away, and the weight of the test piece $V_{24}$ was measured. Then the degree of swelling of the binder was calculated in accordance with the formula $100\times(V_{24}-V_0)/V_0$. As a result of the test, the degree of swelling of the binder used for producing the stripe members of the electrode in GBL was revealed to be 1 mass % or lower.

Evaluation of Impedance of Electrode

The electrode prepared above was cut in 0.5 cm×5 cm in size, and two pieces of them were prepared. The two electrode pieces were placed facing each other with a space of 300 $\mu$m therebetween, and the periphery of the electrode pieces was sealed with a thermosetting epoxy resin in the width of 2 mm except for the inlet port for an electrolyte of about 5 mm long. An electrolyte was prepared by adding $LiClO_4$ to γ-butyrolacton so that the concentration of $LiClO_4$ was 1 M/litter. The thus prepared electrolyte was injected through the inlet port under reduced pressure into the space between the electrode pieces, and the inlet port was then sealed with the epoxy resin. For the purpose of measuring the impedance of the test device thus prepared for evaluation, a lead wire was attached to each of the opposing electrode pieces. The impedance of the test device was evaluated in accordance with the following test.

Electric charges were introduced into the test device for 10 minutes by applying the constant voltage of 1 V across the opposing electrode pieces. Then the electric charge stored in the device was discharged at the constant current (I) of 1 mA, while measuring the potential between the electrodes. The potential was decreased stepwise ($\Delta V$) at the initial stage of the discharge, and then linearly as the discharge proceeded. The impedance (R) of the device was obtained by the formula $R=\Delta V/I$, and the impedance of the electrode $R_0$ was obtained by the formula $R_0=R/2$.

As a result of the test, $\Delta V$ was 0.08 V, and accordingly $R_0=40\ \Omega$.

Method of Measuring Capacity of Activated Carbon Powders

The electrode prepared above was cut in 5 cm×5 cm in size, and two pieces of them were prepared. The two electrode pieces were placed facing each other with a space of 300 µm therebetween, and the periphery of the electrode pieces was sealed with a thermosetting epoxy resin in the width of 2 mm except for the inlet port for an electrolyte of about 5 mm long. An electrolyte was prepared by adding $LiClO_4$ to γ-butyrolacton so that the concentration of $LiClO_4$ was 1 M/liter. The thus prepared electrolyte was injected through the inlet port under reduced pressure into the space between the electrode pieces, and the inlet port was then sealed with the epoxy resin. For the purpose of measuring the impedance of the test device thus prepared for evaluation, a lead wire was attached to each of the opposing electrode pieces.

Electric charges were introduced into the test device for 10 minutes by applying the constant voltage of 1 V across the opposing electrode pieces. Then the electric charge stored in the device was discharged at the constant current (I) of 1 mA, while measuring the potential between the electrodes. The potential was decreased stepwise ($\Delta V$) at the initial stage of the discharge, and then linearly as the discharge proceeded.

The electric capacity (C) of the device was obtained from the inclination of a graph showing the potential decreasing linearly as the discharge proceeded, and the electric capacity of the electrode $C_0$ was obtained by the formula $C_0=C\times 2$ (F). The weight of the stripe portions on the electrodes measured in advance was denoted as M (g), and the weight of the fine particles was obtained from the known weight ratio ρ of the fine particles to the stripe portions as ρ M. The electric capacity Cp of the fine particles per unit weight was obtained by the formula $Cp=C_0/\rho$ M (F/g). In this case, the electric capacities of the transparent electrically conductive substrate, the binder, and the electrically conductive powders were so small with respect to that of the fine powders that they were ignored.

Evaluation of Mechanical Strength of Stripe Members of Electrode

The electrode prepared above- was cut in 5 cm×5 cm in size to prepare an electrode piece, and the mechanical strength of the stripe members on the electrode piece was measured using a surface measuring instrument (trade name "HEIDON-14N" manufactured by SHINTO KAGAKU CORPORATION) equipped with a blade holder to hold a blade normal to a surface of the test piece (for 90 degree) as follows. First, the electrode piece was fixed at the position for placing the sample in the measuring instrument, and a stainless steel plate (blade) having the width of 10 mm, the length of 30 mm, and the thickness of 0.5 mm was fixed in the blade holder so that the stainless steel plate was positioned normal to and contacts the transparent electrically conductive substrate on the surface provided with the stripe members. Then a vertical load of 400 g was applied to the blade holder, and the stainless steel plate was dragged on the transparent electrically conductive substrate at the rate of 30 mm/s to scrape off the stripe members. The tractive force required for the dragging was measured using a load cell (1000 gf maximum). The tractive force was increased at the stripe members of the electrode rather than on the transparent electrically conductive substrate. The amount of this increase was regarded as the mechanical strength of the stripe members of the electrode. The mechanical strength of the stripe members of the electrode thus measured was found to be 780 gf.

Further, the change in the mechanical strength of the stripe members of the electrode caused by immersing the electrode in GBL (containing 1 M $LiClO_4$) was determined. The evaluation of the mechanical strength was made in accordance with the above method. The mechanical strength of the stripe members of the electrode before the immersion was 780 gf, while those after the immersion for 24 hours and 240 hours were 740 gf. Accordingly, no substantial decrease in the mechanical strength was observed.

Preparation of Electrochromic Electrode

Tungsten oxide was deposited on an ITO glass substrate of 5 cm×5 cm in size at room temperature at the rate of 10 to 30 Å/s to have the resulting thickness of 5000 Å, thereby preparing an electrochromic electrode.

Preparation of Electrochromic Device

Figure 11:
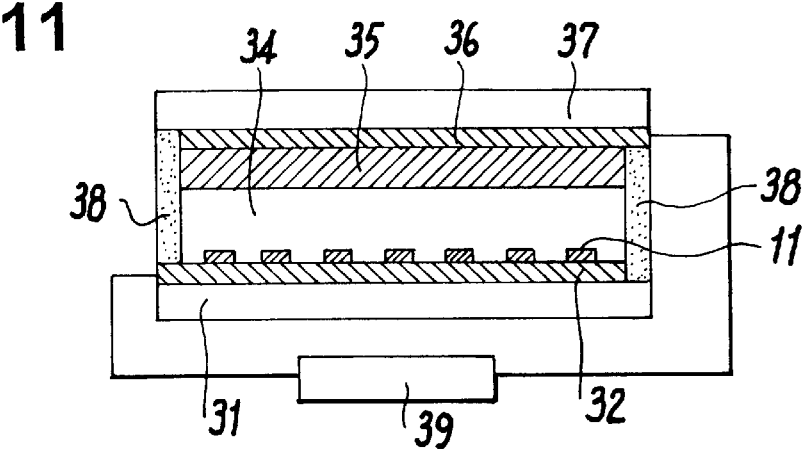
FIG. 11 is a cross-sectional view of one embodiment of an electrochromic device produced in Example.

The electrochromic electrode prepared above and the electrode prepared above as a counterelectrode were placed facing each other with a space of 0.3 mm therebetween, and the periphery of the electrodes was sealed with an epoxy resin in the width of 5 mm except for an inlet for an electrolyte. A propylene carbonate solution of $LiClO_4$ (concentration: 1 M/liter) as an electrolyte was injected through the inlet port into the space between the electrodes under vacuum, and then the inlet port was sealed with the epoxy resin. Subsequently, a lead wire was attached to the electrochromic electrode and the counterelectrode, respectively, thereby preparing a device shown in FIG. 11. The performance of the device thus obtained was evaluated in accordance with the following tests.

Coloring-Bleaching Test

The change in the optical density of the device was determined as follows. The electrochromic device was irradiated at the center thereof with a beam of He—Ne laser of 633 nm expanded to have the diameter of about 20 mm by a beam expander, and the beam transmitted through the center of the device was measured by a Si photodiode. Then the bleaching voltage was applied to the device for bleaching, and the light transmittance of the device in the bleached state $T_{bleach}$ was measured. After that, the coloring voltage was applied to the device for coloring, while the light transmittance was measured every 5 seconds. The light transmittance after the lapse of t seconds from the application of the coloring voltage was denoted as T(t). The change in the optical density at this point of time is defined by the formula below:

Change in Optical Density=$\log(T_{bleach}/T(t))$.

wherein the logarithm is the common logarithm.

When the electric voltage of 1.5 V was applied between the electrochromic electrode as the cathode and the counterelectrode as the anode for 70 seconds, uniform coloring in blue was observed. The optical density at the center of the device in the colored state was 1.50. Further, the change in the optical density after 10 seconds from the commencement of the coloring was 1.30, showing that the coloring responsiveness of the entire device was good.

Subsequently, the electric voltage of 1 V was applied between the electrochromic electrode as the anode and the counterelectrode as the cathode. As a result, the coloring was immediately bleached over the entire device, and the optical density in the bleached state was 0.25. In this case, the difference in the optical density between the colored state and the bleached state was 1.25, demonstrating that high degree of coloration and the coloring rate were achieved.

Example 2

Preparation of Counterelectrode 8 g of powders of activated carbon used in Example 1, 4 g of graphite (trade name "USSP" manufactured by NIPPON GRAPHITE CORPORATION), 26.7 g of silicon varnish (trade name "7931" manufactured by OKITSUMO CORPORATION), and 25 g of butyl cellosolve were mixed to prepare an activated carbon paste. The activated carbon paste was applied to an ITO glass substrate (a transparent electrically conductive glass substrate prepared by forming a film on a glass substrate by sputtering an $In_2O_3$:Sn target) of 10 Ω/sq. in the sheet resistivity and 30cm×30 cm in size to form stripe members each having the width of 500 μm and the thickness of 100 μm and arranged at regular intervals, so that 20% of the surface area of the substrate was covered with the stripe members. Specifically, the stripe members were formed by applying the activated carbon paste on the ITO glass substrate by screen printing method. After that, the activated carbon paste was heated at 180° C. for 90 minutes for curing, thereby preparing an electrode.

Swelling Test on Binder for Molding Stripe Member in GBL

The degree of swelling of the binder was measured in the same way as in Example 1 to find that it was 0.5 mass%.

Evaluation of Impedance of Electrode

The impedance of the electrode was measured in the same way as in Example 1 to find that it was 45 Ω

Evaluation of Mechanical Strength of Stripe Members of Electrode

The mechanical strength of the stripe members formed on the transparent electrically conductive substrate was measured in the same way as in Example 1 to find that it was 690 gf.

Further, the change in the mechanical strength of the stripe members of the electrode caused by immersing the electrode in GBL (containing 1 M $LiClO_4$) was determined in the same way as in Example 1 The mechanical strength of the stripe members of the electrode before the immersion was 690 gf, while those after the immersion for 24 hours and 240 hours were 660 gf. Accordingly, no substantial decrease in the mechanical strength was observed.

Preparation of Electrochromic Electrode

An electrochromic electrode was prepared in the same way as in Example 1.

Preparation of Electrochromic Device

Using the electrochromic electrode prepared above and the electrode prepared above as a counterelectrode, an electrochromic device was prepared in the same way as in Example 1. The performance of the device thus obtained was evaluated in accordance with the following tests.

Coloring-Bleaching Test

When the electric voltage of 1.5 V was applied between the electrochromic electrode as the cathodes and the counterelectrode as the anode for 70 seconds, uniform coloring in blue was observed. The optical density at the center of the device in the colored state measured with the beam of 633 nm was 1.50. Further, the change in the optical density after 10 seconds from the commencement of the coloring was 1.30, showing that the coloring responsiveness of the entire device was good.

Subsequently, the electric voltage of 1 V was applied between the electrochromic electrode as the anode and the counterelectrode as the cathode. As a result, the coloring was immediately bleached, and the optical density in the bleached state was 0.25. In this case, the difference in the optical density between the colored state and the bleached state was 1.25, demonstrating that high degree of coloration and the coloring rate were achieved.

Example 3

Preparation of Electrode 8 g of powders of activated carbon used in Example 1, 4 g of graphite (trade name "USSP" manufactured by NIPPON GRAPHITE CORPORATION), 34.3 g of a silicon resin (trade name "RZ7703" manufactured by NIPPON UNIKER CORPORATION), and 22 g of methylcarbitol were mixed to prepare an activated carbon paste. The activated carbon paste was applied to an ITO glass substrate (a transparent electrically conductive glass substrate prepared by forming a film on a glass substrate by sputtering an $In_2O_3$:Sn target) of 10 Ω/sq. in the sheet resistivity and 30 cm×30 cm in size to form stripe members each having the width of 500 μm and the thickness of 100 μm and arranged at regular intervals, so that 20% of the surface area of the substrate was covered with the stripe members. Specifically, the stripe members were formed by a dispenser with a nozzle dragged at 90 mm/s and discharging the activated carbon paste at 3 mg/s, with its tip being maintained 160 μm away from the transparent electrically conductive substrate. After that, the activated carbon paste was heated at 180° C. for 90 minutes for curing, thereby preparing an electrode.

Swelling Test on Binder for Moldina Stripe Member in GBL

The degree of swelling of the binder was measured in the same way as in Example 1 to find that it was 0.6 mass %.

Evaluation of Impedance of Electrode

The impedance of the electrode was measured in the same way as in Example 1 to find that it was 50Ω.

Evaluation of Mechanical Strength of Stripe Members of Electrode

The mechanical strength of the stripe members formed on the transparent electrically conductive substrate was measured in the same way as in Example 1 to find that it was 700 gf.

Further, the change in the mechanical strength of the stripe members of the electrode caused by immersing the electrode in GBL (containing 1 M $LiClO_4$) was determined in the same way as in Example 1. The mechanical strength of the stripe members of the electrode before the immersion was 700 gf, while those after the immersion for 24 hours and 240 hours were 655 gf. Accordingly, no substantial decrease in the mechanical strength was observed.

Preparation of Electrochromic Electrode

An electrochromic electrode was prepared in the same way as in Example 1.

Preparation of Electrochromic Device

Using the electrochromic electrode prepared above and the electrode prepared above as a counterelectrode, an electrochromic device was prepared in the same way as in Example 1. The performance of the device thus obtained was evaluated in accordance with the following tests.

Coloring-Bleaching Test

When the electric voltage of 1.5 V was applied between the electrochromic electrode as the cathode and the counterelectrode as the anode for 70 seconds, uniform coloring in blue was observed. The optical density at the center of the device in the colored state measured with the beam of 633 nm was 1.55. Further, the change in the optical density after 10 seconds from the commencement of the coloring was 1.30, showing that the coloring responsiveness of the entire device was good.

Subsequently, the electric voltage of 1 V was applied between the electrochromic electrode as the anode and the counterelectrode as the cathode. As a result, the coloring was immediately bleached, and the optical density in the bleached state was 0.25. In this case, the difference in the optical density between the colored state and the bleached state was 1.30, demonstrating that high degree of coloration and the coloring rate were achieved.

Example 4

Preparation of Electrode 8 g of powders of activated carbon used in Example 1, 4 g of graphite (trade name "USSP" manufactured by NIPPON GRAPHITE CORPORATION), 26.7 g of silicon varnish (trade name "7931" manufactured by OKITSUMC CORPORATION), and 25 g of butyl cellosolve were mixed to prepare an activated carbon paste. The activated carbon paste was applied to an ITO glass substrate (a transparent electrically conductive glass substrate prepared by forming a film on a glass substrate by sputtering an $In_2O_3$:Sn target) of 10 Ω/sq. in the sheet resistivity and 30 cm×30 cm in size to form stripe members each having the width of 500 μm and the thickness of 100 μm and arranged at regular intervals, so that 20% of the surface area of the substrate was covered with the stripe members. Specifically, the stripe members were formed by applying the activated carbon paste on the ITO glass substrate by screen printing method. After that, the activated carbon paste was heated at 180° C. for 90 minutes for curing, thereby preparing an electrode.

Swelling Test on Binder for Molding Stripe Member in GBL

The degree of swelling of the binder was measured in the same way as in Example 1 to find that it was 0.3 mass %

Evaluation of Impedance of Electrode

The impedance of the electrode was measured in the same way as in Example 1 to find that it was 40 Ω.

Evaluation of Mechanical Strength of Stripe Members of Electrode

The mechanical strength of the stripe members formed on the transparent electrically conductive substrate was measured in the same way as in Example 1 to find that it was 790 gf.

Further, the change in the mechanical strength of the stripe members of the electrode caused by immersing the electrode in GBL (containing 1 M $LiClO_4$) was determined in the same way as in Example 1. The mechanical strength of the stripe members of the electrode before the immersion was 790 gf, while those after the immersion for 24 hours and 240 hours were 660 gf. Accordingly, no substantial decrease in the mechanical strength was observed.

Preparation of Electrochromic Electrode

An electrochromic electrode was prepared in the same way as in Example 1.

Preparation of Electrochromic Device

Using the electrochromic electrode prepared above and the electrode prepared above as a counterelectrode, an electrochromic device was prepared in the same way as in Example 1. The performance of the device thus obtained was evaluated in accordance with the following tests.

Coloring-Bleaching Test

When the electric voltage of 1.5 V was applied between the electrochromic electrode as the cathode and the counterelectrode as the anode for 70 seconds, uniform coloring in blue was observed. The optical density at the center of the device in the colored state measured with the beam of 633 nm was 1.50. Further, the change in the optical density after 10 seconds from the commencement of the coloring was 1.30, showing that the coloring responsiveness of the entire device was good.

Subsequently, the electric voltage of 1 V was applied between the electrochromic electrode as the anode and the counterelectrode as the cathode. As a result, the coloring was immediately bleached, and the optical density in the bleached state was 0.25. In this case, the difference in the optical density between the colored state and the bleached state was 1.25, demonstrating that high degree of coloration and the coloring rate were achieved.

Example 5

Preparation of Electrode 8 g of powders of activated carbon used in Example 1, 4 g of graphite (trade name "USSP" manufactured by NIPPON GRAPHITE CORPORATION), 34.3 g of silicon resin (trade name "RZ7703" manufactured by NIPPON UNIKER CORPORATION), and 22 g of methylcarbitol were mixed to prepare an activated carbon paste. The activated carbon paste was applied to an ITO glass substrate (a transparent electrically conductive glass substrate prepared by forming a film on a glass substrate by sputtering an $In_2O_3$:Sn target) of 10 Ω/sq. in the sheet resistivity and 30 cm×30 cm in size to form stripe members each having the width of 500 μm and the thickness of 100 μm and arranged at regular intervals, so that 20% of the surface area of the substrate was covered with the stripe members. Specifically, the stripe members were formed by a dispenser with a nozzle dragged at 100 mm/s and discharging the activated carbon paste at 6 mg/s, with its tip being maintained 160 μm away from the transparent electrically conductive substrate. After that, the activated carbon paste was heated at 180° C. for 90 minutes for curing, thereby preparing an electrode.

Swelling Test on Binder for Molding Stripe Member in GBL

The degree of swelling of the binder was measured in the same way as in Example 1 to find that it was 0.6 mass %.

Evaluation of Impedance of Electrode

The impedance of the electrode was measured in the same way as in Example 1 to find that it was 35 Ω.

Evaluation of Mechanical Strength of Stripe Members of Electrode

The mechanical strength of the stripe members formed on the transparent electrically conductive substrate was measured in the same way as in Example 1 to find that it was 670 gf.

Further, the change in the mechanical strength of the stripe members of the electrode caused by immersing the electrode in GBL (containing 1 M $LiClO_4$) was determined in the same way as in Example 1. The mechanical strength of the stripe members of the electrode before the immersion was 670 gf, while those after the immersion for 24 hours and 240 hours were 655 gf. Accordingly, no substantial decrease in the mechanical strength was observed.

Preparation of Electrochromic Electrode

An electrochromic electrode was prepared in the same way as in Example 1.

Preparation of Electrochromic Device

Using the electrochromic electrode prepared above and the electrode prepared above as a counterelectrode, an electrochromic device was prepared in the same way as in Example 1. The performance of the device thus obtained was evaluated in accordance with the following tests.

Coloring-Bleaching Test

When the electric voltage of 1.5 V was applied between the electrochromic electrode as the cathode and the counterelectrode as the anode for 70 seconds, uniform coloring in blue was observed. The optical density at the center of the device in the colored state measured with the beam of 633 nm was 1.55. Further, the change in the optical density after 10 seconds from the commencement of the coloring was 1.30, showing that the coloring responsiveness of the entire device was good.

Subsequently, the electric voltage of 1 V was applied between the electrochromic electrode as the anode and the counterelectrode as the cathode. As a result, the coloring was immediately bleached, and the optical density in the bleached state was 0.25. In this case, the difference in the optical density between the colored state and the bleached state was 1.30, demonstrating that high degree of coloration and the coloring rate were achieved.

Comparative Example 1

Preparation of Electrode 8 g of powders of activated carbon used in Example 1, 4 g of graphite (trade name "USSP" manufactured by NIPPON GRAPHITE CORPORATION, ketchen black, acetylene black), 10 g of a thermosetting acrylic resin (trade name "S4030" manufactured by TOA GOSEI CHEMICAL INDUSTRY CO., LTD.), 2.2 g of melamine resin (trade name "MX-470" manufactured by SANWA CHEMICAL CORPORATION), and 25 g of butyl cellosolve were mixed to prepare an activated carbon paste. Using this activated carbon paste, an electrode was prepared in the same way as in Example 1.

Swelling Test on Binder for Moldina Stripe Member in GBL

The degree of swelling of the acrylic melamine resin binder in GBL was measured in the same way as in Example 1 to find that it was 26 mass %.

Evaluation of Impedance of Electrode

The impedance of the electrode was measured in the same way as in Example 1 to find that it was 110 Ω.

Evaluation of Mechanical Strength of Stripe Members of Electrode

The mechanical strength of the stripe members formed on the transparent electrically conductive substrate was measured in the same way as in Example 1 to find that it was 870 gf.

However, the mechanical strength of the stripe members after being immersed in GBL for 24 hours was declined to as low as 510 gf. Although, with the electrode prepared in Example 1, no substantial decrease in the mechanical strength was observed, the mechanical strength of this electrode decreased to about 60% of the initial strength. Further, when the electrode was kept immersed in GBL, the mechanical strength decreased further, and after 1 month of immersion, the mechanical strength decreased to as low as 150 gf.

Preparation of Electrochromic Electrode

An electrochromic electrode was prepared in the same way as in Example 1.

Preparation of Electrochromic Device

Using the electrochromic electrode prepared above and the electrode prepared above as a counterelectrode, an electrochromic device was prepared in the same way as in Example 1. The performance of the device thus obtained was evaluated in accordance with the following tests.

Coloring-Bleaching Test

The electrochromic device was operated in the same way as in Example 1. When the electric voltage of 1.5 V was applied between the electrochromic electrode as the cathode and the counterelectrode as the anode for 70 seconds, uniform coloring in blue was observed. The optical density at the center of the device in the colored state measured with the beam of 633 nm was 1.20. The change in the optical density after 10 seconds from the commencement of the coloring was 0.6.

Subsequently, the electric voltage of 1 V was applied between the electrochromic electrode as the anode and the counterelectrode as the cathode. As a result, the coloring was immediately bleached, and the optical density in the bleached state was 0.25. In this case, the difference in the optical density between the colored state and the bleached state was 0.95.

From this test, it was revealed that the coloring-bleaching responsiveness of the electrochromic device was impaired when the electrode for electrochromic device of Comparative Example 1 having the stripe members with high degree of swelling was used for preparing the device, as compared to that of Example 1 having the low degree of swelling of the present invention.

Comparative Example 2

Preparation of Electrode 12 g of graphite (trade name "USSP" manufactured by NIPPON GRAPHITE CORPORATION), 26.7 g of silicon varnish (trade name "7931" manufactured by OKITSUMO CORPORATION), and 25 g of butyl cellosolve were mixed to prepare a graphite paste. The graphite paste was applied to an ITO glass substrate (a transparent electrically conductive glass substrate prepared by forming a film on a glass substrate by sputtering an $In_2O_3$:Sn target) of 10 Ω/sq. in the sheet resistivity and 30 cm×30 cm in size to form stripe members each having the width of 500 µm and the thickness of 100 µm and arranged at regular intervals, so that 20% of the surface area of the substrate was covered with the stripe members. Specifically, the stripe members were formed by applying the graphite paste to the substrate by screen printing method. After that, the graphite paste was heated at 180° C. for 90 minutes for curing, thereby preparing an electrode.

Swelling Test on Binder for Molding Stripe Member in GBL

The degree of swelling of the binder was measured in the same way as in Example 1 to find that it was 0.4 mass %.

Evaluation of Impedance of Electrode

The impedance of the electrode was measured in the same way as in Example 1 to find that it was 15 Ω.

Evaluation of Mechanical Strength of Stripe Members of Electrode

The mechanical strength of the stripe members formed on the transparent electrically conductive substrate was measured in the same way as in Example 1 to find that it was 900 gf.

Further, the change in the mechanical strength of the stripe members of the electrode caused by immersing the electrode in GBL (containing 1 M $LiClO_4$) was determined in the same way as in Example 1. The mechanical strength of the stripe members of the electrode before the immersion was 900 gf, while those after the immersion for 24 hours and 240 hours were 870 gf. Accordingly, no substantial decrease in the mechanical strength was observed.

Preparation of Electrochromic Electrode

An electrochromic electrode was prepared in the same way as in Example 1.

Preparation of Electrochromic Device

Using the electrochromic electrode prepared above and the electrode prepared above as a counterelectrode, an electrochromic device was prepared in the same way as in Example 1. The performance of the device thus obtained was evaluated in accordance with the following tests.

Coloring-Bleaching Test

When the electric voltage of 1.5 V was applied between the electrochromic electrode as the cathode and the counterelectrode as the anode for 70 seconds, uniform coloring in blue was observed. The optical density at the center of the device in the colored state measured with the beam of 633 nm was 0.50. Further, the change in the optical density after 10 seconds from the commencement of the coloring was 0.50. Accordingly, the coloring responsiveness of the device was worse than those of Examples.

Subsequently, the electric voltage of 1 V was applied between the electrochromic electrode as the anode and the counterelectrode as the cathode. As a result, the coloring was immediately bleached, and the optical density in the bleached state was 0.25. In this case, the difference in the optical density between the colored state and the bleached state was 0.25. It was demonstrated that the device of Comparative Example 2 exhibited poor coloring effect and the coloring rate as compared to those of Examples.

Although the present invention has been described with reference to the preferred examples, it should be understood that various modifications and variations can be easily made by those skilled in the art without departing from the spirit of the invention. Accordingly, the foregoing disclosure should be interpreted as illustrating only and is not to be interpreted in a limiting sense. The present invention is limited only by the scope of the following claims.

What is claimed is:

1. An electrode for an electrochromic device comprising an electrically conductive substrate and a plurality of capacitive members arranged or said substrate, each of said capacitive members comprising fine particles bound together with a binder, said fine particles having electric capacity of not less than 1 farad/g, said binder in the capacitive member having degree of swelling of not higher than 20 mass % when measured after the binder in the capacitive member is immersed in γ-butyrolactone at 25° C. for 24 hours.

2. The electrode as claimed in claim 1 wherein said electrically conductive substrate is a transparent electrically conductive substrate having a transparent substrate and a transparent electrically conductive film formed on the transparent substrate.

3. The electrode as claimed in claim 1 wherein said fine particles further have a property selected from the group consisting of electrical conductivity of not lower than $10^{-8} S \cdot cm^{-1}$, capability of storing electric charge of not less than 1 coulomb/g, and combinations thereof.

4. The electrode as claimed in claim 1 wherein said fine particles are made of a material selected from the group consisting of porous carbon, an intercalation material, an electrically conductive polymer, and mixtures thereof.

5. The electrode as claimed in claim 4 wherein said porous carbon is activated carbon having the specific surface area of not less than 10 $m^2/g$, wherein said intercalation material is selected from the group consisting of $TiS_2$, $MOS_2$, $CoO2$, $NiO_2$, $W_{18}O_{48}$, and $W_{20}O_{58}$, and wherein said electrically conductive polymer is an electrically conductive material prepared by subjecting a polymer selected from the group consisting of polyaniline, polythiophene, polypyrrole, polyphenylenevinylene, polyacene, and mixtures thereof to doping.

6. The electrode as claimed in claim 1 wherein average particle size of said fine particles is 0.1 to 500 μm.

7. The electrode as claimed in claim 1 wherein said binder is selected from the group consisting of a silicon resin, an epoxysilane resin, a phenol resin, and an epoxy resin.

8. The electrode as claimed in claim 7 wherein said silicon resin is a reactive silicon resin prepared by curing a binder precursor having at least one of an alkoxysilyl group and a silanol group and having number average molecular weight of 200 to 20000.

9. The electrode as claimed in claim 1 wherein mixing ratio of said fine particles to said binder in said capacitive member is 90:10 to 20:80 by weight.

10. The electrode as claimed in claim 1 wherein said capacitive member further contains an electrically conductive material other than said fine particles, and said electrically conductive material and the fine particles are bound together with the binder.

11. The electrode as claimed in claim 10 wherein said electrically conductive material is selected from the group consisting of graphite, acetylene black, ketchen black, fine metal particles, polyphenylene vinyl subjected to doping, polythiophene subjected to doping, and polypyrrole subjected to doping.

12. The electrode as claimed in claim 10 wherein amount of said electrically conductive material in the capacitive member is equal to or less than the amount of the fine particles.

13. The electrode as claimed in claim 1 wherein configuration of the capacitive members formed on the electrically conductive substrate is selected from the group consisting of a plurality of dots, a plurality of stripes, and a net.

14. The electrode as claimed in claim 13 wherein width of each of said stripes and a line of the net is 50 to 5000 μm, and intervals between the stripes and lines of the net is 0.3 mm to 10 cm.

15. The electrode as claimed in claim 13 wherein size of each of said dots is such that a projection of each of said dots onto the electrically conductive substrate is contained in a circle with a diameter of 50 to 10000 μm, and intervals between the dots is 0.2 mm to 10 cm.

16. The electrode as claimed in claim 1 wherein thickness of the capacitive member is not less than 50 μm.

17. The electrode as claimed in claim 1 wherein the capacitive members are arranged on the electrically conductive substrate at regular intervals.

18. The electrode as claimed in claim 1 wherein coverage of the electrode with the capacitive members ((total area of the capacitive members/area of the electrode)×100) is 3 to 70%.

19. The electrode as claimed in claim 1 wherein mechanical strength of the capacitive member is not lower than 10 gf.

20. The electrode as claimed in claim 1 wherein a coating material selected from the group consisting of a white pigment, a white electrically conductive paste, and a silver electrically conductive paste is applied to a surface of the electrically conductive substrate in registration with the capacitive members.

21. An electrochromic device comprising the electrode for an electrochromic device as claimed in claim 1 as a counterelectrode, an electrochromic electrode, and an electrolyte interposed between the counterelectrode and the electrochromic electrode.

22. The electrochromic device as claimed in claim 21 wherein said electrochromic electrode comprises a transparent electrode substrate, and an electrochromic film formed on the transparent electrode substrate.

23. The electrochromic device as claimed in claim 22 wherein said electrochromic film is made of a material selected from the group consisting of $WO_3$, $MoO_3$, $V_2O_5$, $Nb_2O_5$, $TiO_2$, $NiO$, $Cr_2O_3$, $MnO_2$, $CoO$, $IrO_2$, Prussian Blue, and polyaniline.

24. The electrochromic device as claimed in claim 21 wherein said electrolyte is selected from the group consisting of a liquid electrolyte and a solid electrolyte.

* * * * *